(12) United States Patent
Mahmodieh et al.

(10) Patent No.: US 10,637,291 B2
(45) Date of Patent: Apr. 28, 2020

(54) METHODS AND APPARATUS TO INCREASE EFFICIENCY FOR WIRELESS POWER TRANSFER

(71) Applicant: TEXAS INSTRUMENTS INCORPORATED, Dallas, TX (US)

(72) Inventors: Kosha Mahmodieh, Campbell, CA (US); Gianpaolo Lisi, Los Gatos, CA (US); Ali Djabbari, Saratoga, CA (US); Jingwei Xu, Plano, TX (US); Vijayalakshmi Devarajan, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/214,733

(22) Filed: Dec. 10, 2018

(65) Prior Publication Data

US 2019/0109493 A1 Apr. 11, 2019

Related U.S. Application Data

(63) Continuation of application No. 15/362,563, filed on Nov. 28, 2016, now Pat. No. 10,153,661.

(51) Int. Cl.
*H02J 50/10* (2016.01)
*H02J 7/02* (2016.01)
*H02J 50/12* (2016.01)

(52) U.S. Cl.
CPC .............. *H02J 50/10* (2016.02); *H02J 7/025* (2013.01); *H02J 50/12* (2016.02)

(58) Field of Classification Search
CPC ...................................................... H02J 50/10
USPC ........................................................ 307/104
See application file for complete search history.

(56) References Cited

U.S. PATENT DOCUMENTS

| 8,872,384 | B2 | 10/2014 | Stratakos et al. |
| 10,153,661 | B2* | 12/2018 | Mahmodieh ............ H02J 50/10 |
| 2013/0234531 | A1 | 9/2013 | Budgett et al. |

* cited by examiner

*Primary Examiner* — Joseph Chang
(74) *Attorney, Agent, or Firm* — Michael A. Davis, Jr.; Charles A. Brill; Frank D. Cimino (57) ABSTRACT

An example apparatus includes a feedback loop to: change a direction value when a second current value is greater than a first current value, the second current value being obtained after the first current value; and maintain the direction value when the second current value is less than the first current value. When the direction value corresponds to a first direction value, a summer increases a reference signal by a step size. When the direction value corresponds to a second direction value different than the first direction value, the summer decrease the reference signal by the step size.

10 Claims, 5 Drawing Sheets

METHODS AND APPARATUS TO INCREASE EFFICIENCY FOR WIRELESS POWER TRANSFER

CROSS-REFERENCE TO RELATED APPLICATION

This application is a continuation of U.S. patent application Ser. No. 15/362,563 filed Nov. 28, 2016, which is fully incorporated herein by reference.

BACKGROUND

This relates generally to power transfer, and more particularly to methods and apparatus to increase efficiency for wireless power transfer.

Wireless power transfer methods have become increasingly popular. Often, a transmitter communicates with a receiver to determine power requirements during wireless power transfer. For example, the communication may relate to load increases, decreases, etc. However, continuous communication consumes power that could otherwise be saved or wirelessly transferred for use by loads on the receiver end.

DETAILED DESCRIPTION OF EXAMPLE EMBODIMENTS

The drawings are not to scale. Wherever possible, the same reference numbers are used throughout the drawing(s) and accompanying written description to refer to the same or like parts.

Many electronic devices are equipped to be powered and/or charged wirelessly. To power and/or charge an electronic device wirelessly, a wireless power transfer system is used. Often, receiver electronics requiring a set operating voltage and/or the resource requirements of an electronic device change over time (e.g., as additional components of the electronic device are initiated), requiring regulation of the output voltage of the wireless power transfer system. Wireless power transfer systems include a transmitter circuit to wirelessly provide power to a receiver circuit based on a desired output power of the receiver circuit. In conventional wireless power transfer system, field optimization (e.g., to increase and/or otherwise maximize efficiency) is achieved through communications (e.g., Bluetooth low energy, Wi-Fi, near field communication, etc.) between a wireless power transmitter and a wireless power receiver. In such conventional systems, the wireless power receiver communicates continuously with the wireless power transmitter to request more or less power and the transmitter side adjusts its output accordingly. Such conventional communication allows the transmitter to provide the power needed by the receiver at a given time. However, conventional continuous communication between the transmitter and the receiver is inefficient because such conventional communication requires a communication circuit at both the transmitter and the receiver that draws power and requires a more complex and expensive system. Examples described herein maximize efficiency by regulating the output voltage based on leveraging characteristics of a receiver extracted from the transmitter, thereby eliminating the need for communications between the transmitter and the receiver, reducing the complexity and power consumption of conventional wireless power transfer systems. Such characteristics include, but are limited to, the receiver's power information deduced from the operating voltage of the receiver, the relationship between an input DC current generated by a voltage source and an inductor current in a transmitter, etc. Using examples described herein, a wireless power transfer system saves significant power by varying output voltage to increase system efficiency without a communication link between a transmitter and a receiver. Because, in some examples, output power may not vary for a given load, varying output voltage can increase the efficiency of the system (e.g., $R_{opt}=V_{out}^2/P_{out}$, where $R_{opt}$ is the point at which the efficiency is maximized).

Examples described herein include a transmitter to wirelessly transmit power to a receiver through inductive coupling between a first inductor of the transmitter and a second inductor of the receiver. In some examples, direct (DC) current is applied to the transmitter and the transmitter converts DC to alternating current (AC) current before wireless transfer via the first and second inductors. The receiver receives the AC current from the transmitter and converts the AC current to DC current. In such examples, the wireless power transfer circuit may be a DC current to DC current wireless power transfer circuit.

A transmitter may include a DC power source that provides input voltage and input current such as, for example, a DC current. In some examples, the voltage from the power source is constant. Because the voltage drop across the load of the receiver is proportional to the transmitter current, when the load of the receiver changes, the DC current will likewise change. For example, as the load increases or decreases, the transmitter current changes proportionally. The example DC current also varies because the example transmitter current is a fraction of the input DC current (e.g., according to Kirchhoff's current law). Additionally, the input power varies with the input DC current according to Equation 1:

$$P_{input}=V_{DC}*I_{DC} \quad \text{Equation 1}$$

In some examples, a voltage rectifier may be implemented in the receiver to adjust power received from the transmitter to comply with the power requirements of the load. In such examples, the input power sent from the transmitter may be smaller than the power required by the load at the receiver. The wireless power transfer circuit is most efficient when the input power is at a minimum according to Equation 2:

$$\eta = \frac{P_{Load}}{P_{input}} \quad \text{Equation 2}$$

Figure 4:
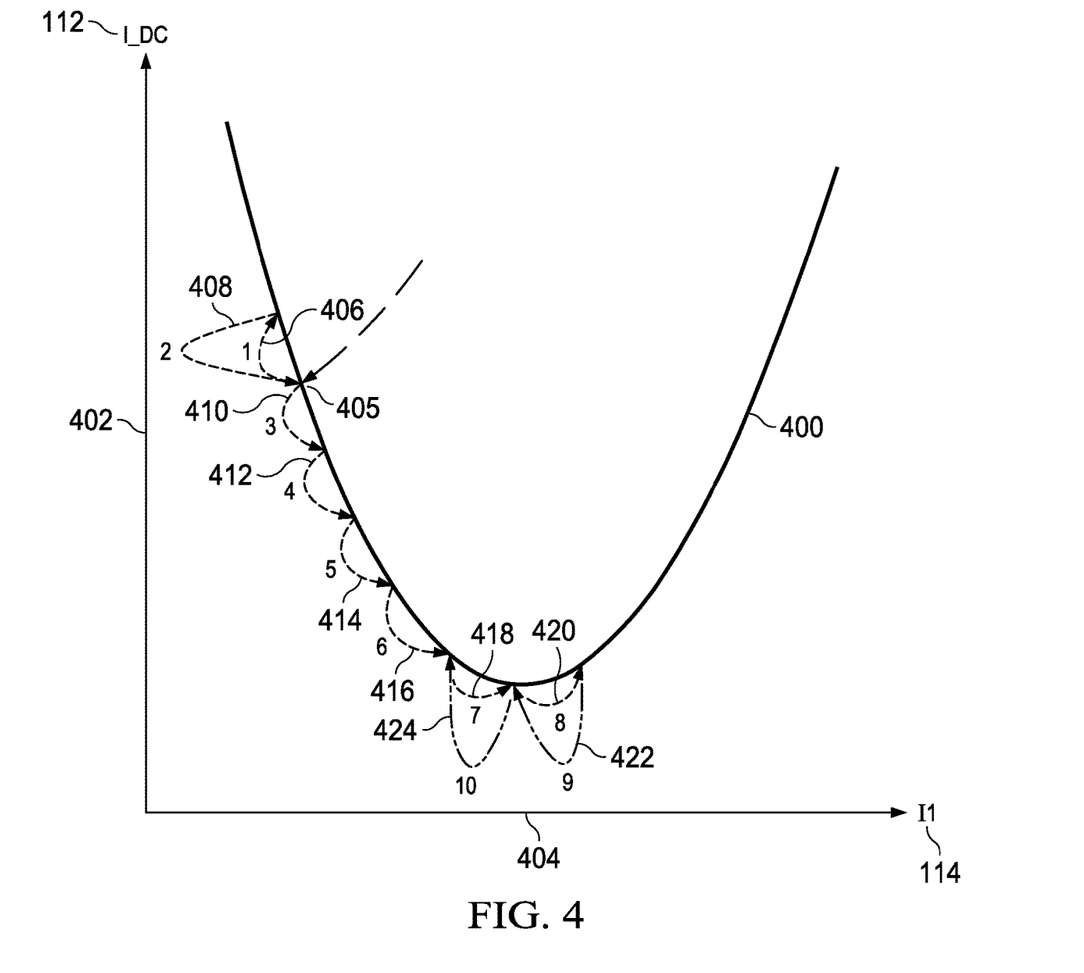
FIG. 4 is an example graph of a relationship between input current and output current associated with an example process corresponding to execution of the instructions of FIG. 3.

As described herein, methods and apparatus to efficiently transfer power wirelessly reduce the input power of the example transmitter by adjusting a voltage across the inductor (e.g., an inductor voltage), thereby adjusting the transmitter current. As shown in Equation 1, $P_{input}$ is reduced when the DC current of the transmitter is reduced because $V_{DC}$ is constant. As illustrated in FIG. 4, the DC current is a function of the inductor current. Thus, examples described herein reduce the DC current by adjusting the inductor current. The example methods and apparatus described herein alleviate power consumption concerns associated with the conventional continuous communication between the transmitter and the receiver by monitoring the effect changes to the transmitter current have on the input DC current, allowing the elimination of the communication link. The example methods and apparatus described herein adjust the transmitter current to determine a minimum input DC current, which is proportional to a minimum input power.

An example apparatus includes a feedback loop to when a second current value is greater than a first current value, change a direction value, the second current value being obtained after the first current value; when the second current value is less than the first current value, maintain the direction value. The example apparatus further includes a summer to when the direction value corresponds to a first direction value, increase a reference signal by a step size; and when the direction value corresponds to a second direction value different than the first direction value, decrease the reference signal by the step size.

Figure 1:
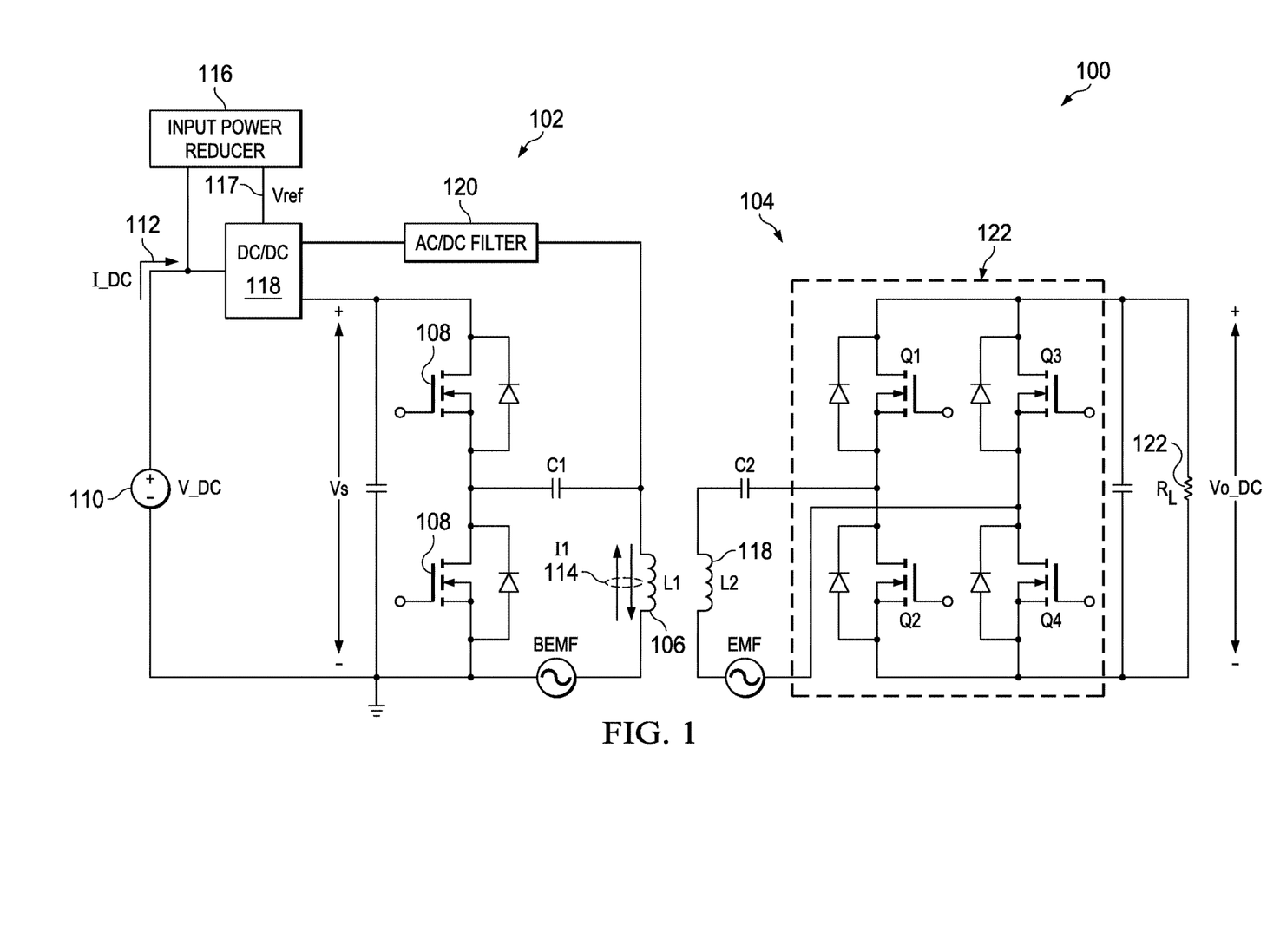
FIG. 1 is an illustration of an example wireless power transfer circuit.

FIG. 1 is an example wireless transfer system 100, described herein to optimize the efficiency of wireless power transfer. The example wireless transfer system 100 includes an example transmitter 102 and an example receiver 104. The example transmitter 102 includes an example an example inductor 106, example transistors 108, and an example DC power source (V_DC) 110 that provides an example DC current (I_DC) 112. An example transmitter (e.g., inductor) current (I1) 114 flows through the example inductor 106, an example input power reducer 116, an example reference voltage 117, an example DC/DC converter 118, and an example AC/DC filter 120. The example receiver 104 includes an example inductor 106, an example rectifier 122, and an example load 122.

The example transmitter 102 wirelessly transmits power to the example receiver 104 through inductive coupling between the example inductor 106 and the example inductor 106 based on the control of a half-bridge inverter including the example transistors 108 (e.g., which may be controlled by a controller). Although the example transmitter 102 of FIG. 1 includes a half-bridge inverter with two example transistors 108, the example transmitter 102 may include any type of inverter with any number of transistors. The example transmitter 102 includes the example DC power source 110 (e.g., a constant voltage source) that provides the example DC current 112, which may proportionally increase or decrease when the example load 122 changes. Additionally, the example DC current 112 varies because the example inductor current 114 is a fraction of the DC current 112. As described above, the input power (e.g., $P_{input}=V_{DC}*I_{DC}$) varies with the example DC current 112.

The example transmitter 102 includes the example input power reducer 116, which adjusts the example Vref 117. The example Vref 117 is received by the example DC/DC converter 118 to adjust its output so that the voltage applied to the example inductor 106 matches a voltage corresponding to Vref 117, thereby adjusting the example inductor current 114. The DC/DC converter 118 receives a value from the example AC/DC filter 120 which corresponds to the actual voltage applied to the example inductor 106 because the voltage at the example inductor 106 is an AC voltage (e.g., creating a feedback loop). Adjusting the example inductor current 114, in turn, adjusts the example DC current 112. As described above, adjusting the example DC current 112 adjusts the input power until the optimal efficiency is reached (e.g., until the example DC current 112 is substantially minimized). For example, as the example load 122 changes, the example input power can be adjusted to maintain the most efficient power transfer (e.g., by reducing the input power to a minimum). The example input power reducer 116 is further described in conjunction with FIG. 2. The example inductor 106 of the example receiver 104 wireless receives the power generated by the example receiver 104. The received power signal is rectified by the example rectifier 122, which provides power as an output DC voltage across the example load 122.

Figure 2:
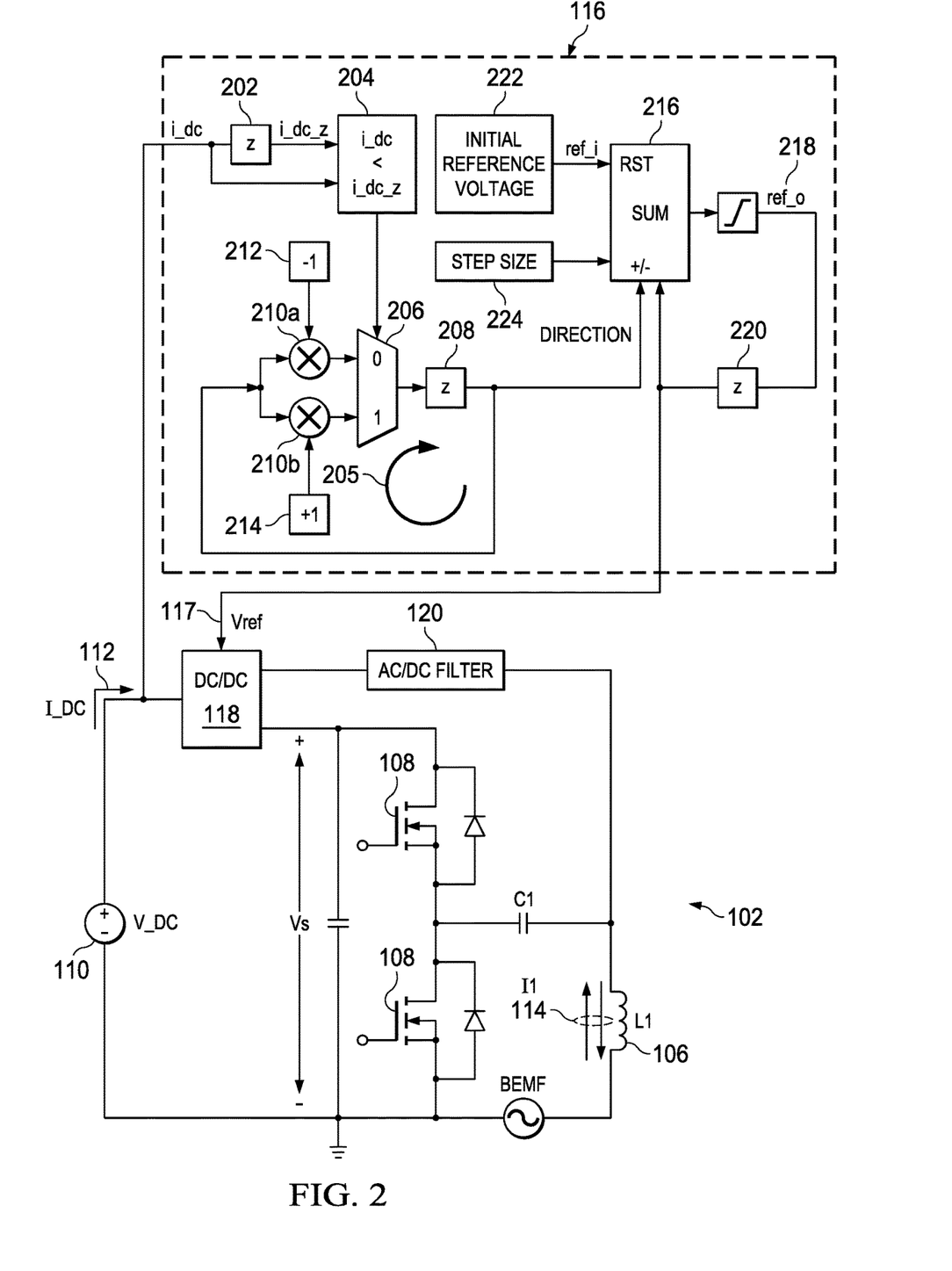
FIG. 2 is illustration of an example input power reducer circuit to adjust the DC current at the transmitter of the wireless power transfer circuit of FIG. 1 to reduce the input power.

FIG. 2 illustrates the example transmitter 102 of FIG. 1 to adjust the inductor current 114 by way of the example Vref 117, thereby reducing the input power to increase the efficiency of wireless power transfer via the example input power reducer 116. The example input power reducer 116 includes example registers 202, 208, 220 an example comparator 204, an example feedback loop 205, an example summer 216, an example reference output signal 218, an example initial reference voltage generator 222, and an example step size generator 224. The example feedback loop 205 includes an example multiplexer 206, example multipliers 210a, 210b, and example scalars 212, 214.

The example register 202 receives a value representative of the DC current 112. The example register 202 temporarily stores the DC current 112 and outputs the stored (e.g. held) DC current 112 (e.g., i_dc_z) to the example comparator 204 at a second time. In this manner, the example comparator 204 can compare a previous value of the DC current 112 to a present DC current 112 value. The register 202 stores a value of the example DC current 112 at a first time for comparison with the example DC current 112 at a second time. The example register 202 holds the example DC current 112 until the example comparator 204 makes its comparison. At that point, the held DC current is discarded and the present DC current 112 is stored. In this manner, the example comparator 204 can continue to compare the present DC current 112 value to a previous DC current 112 value. In some example, the example comparator 204 compares a value corresponding to the DC current 112 and a value the held DC current in the example register 202.

The example comparator 204 compares the output of the register 202 to the DC current 112. For example, the comparator 204 outputs a logic value of '1' when the DC current 112 is less than the output of the example register 202 (e.g., the previously sampled DC current) and outputs a logic value of '0' when the DC current 112 is greater than the output of the example register 202. The output of the example comparator 204 is input to the feedback loop 205 including the example multiplexer 206, the example register 208, the example multipliers 210a, 210b, the example scalars 212, 214. The output of the example comparator 204 is feed to the select input of the example multiplexer 206. The example comparator 204 indicates whether the example DC current 112 increases or decreases as a result to an adjustment to the inductor current 114. For example, the example comparator 204 switches logic states if the present or "live value" of the example DC current 112 is greater than the historical value of the DC current (e.g., indicating that the DC current decreased). The example comparator 204 maintains the logic state if the present or "live value" of the example DC current 112 is less than or equal to the historical value of the DC current (e.g., indicating that the DC current increased). In some examples, the example comparator 204 compares periodically based on an internal clock and/or a received clock signal.

In the example feedback loop 205, the example multiplexer 206 receives a previous output stored in the example register 208 transformed by one of the example scalar values 212, 214. The previously stored output corresponds to a negative direction (e.g., −1) or a positive direction (e.g., +1) that is used by the example summer 216 to generate a sum (e.g., based on a positive direction (ref_out=ref_out+direction*step_size)) or a difference (e.g., based on a negative direction (ref_out=ref_out+direction*step_size)). The first example scalar value 212 is negative one and the second example scalar value 214 is positive one. The first multiplier 210a multiplies the previously stored direction by the first example scalar 212 to create an opposite direction, thereby changing the functionality of the example summer 216 (e.g., from generating a sum to generating a diverse or vice versa). The second multiplier 210b multiplies the previously stored direction by the second example scalar 214 to continue to output the same direction as the previously stored direction, thereby maintaining the functionality of the example summer 216. The output of the example register 208 is fed back and either maintained or negated based on the output of the example comparator 204. In this manner, when the DC current 112 is less than the output of the example register 202 (e.g., the previously sampled DC current), the output of the example register 208 is maintained (e.g., kept at −1 or kept at +1) and, when the DC current 112 is greater than the output of the example registered 202, the output of the example register 208 changes (e.g., from −1 to +1 or from +1 to −1). Alternatively, because multiplication by one is the identity property of multiplication, previously stored direction may directly enter a first input of the multiplexer 206. In this manner, the example multiplexer 206 outputs a positive direction or a negative direction depending on the output of the example comparator 204. The output of the example multiplexer 206 replaces the previously stored direction (e.g., +1 or −1) in the example register 208 with the new stored direction and maintains the new stored direction until a subsequent comparison occurs. The example register 208 may be correspond to a reset/start-up value (e.g., either 1 or −1) to generate a direction at start-up.

The example summer 216 of FIG. 2 outputs the example reference output 218 based on the output of the example register 208 (e.g., corresponding to a direction), the example step size output by the example step size generator 224, and a previous output (e.g., stored in the example register 220) or an initial reference voltage output by the example initial reference voltage generator 222. The example step-size is a value used to increment or decrement the example reference output 218 and/or the initial reference voltage. In some examples, the example step-size is an incremental value of the example reference voltage 117. For example, the step-size may be $\frac{1}{16}^{th}$ of the example reference voltage 117. In some examples, the step-size may alternatively be $\frac{1}{64}^{th}$ of the example reference voltage 117. In some examples, the summer 216 adjusts the step-size depending on the history of incremental/decremental step-sizes. For example, if the inductor current 114 has been adjusted in opposite directions more than twice (e.g., positive step-size, negative step-size, positive step-size, negative step-size, etc.) within a threshold amount of time, the example summer 216 determines the inductor current 114 is near a minimum level (e.g., a lowest point in a parabolic function). Thus, to be more accurate in the reducing of the inductor current 114, the example summer 216 may decrease the step-size for more granular steps. In some examples, the inductor current 114 being at a minimum level may only reflect a local minima, which, as described above, corresponds to the most efficient power transfer. In such examples, the example summer 216 may increase the step-size to determine whether the minimum level is a minima and not the lowest portion of a function. In some examples, the summer 216 identifies maximums and local maxima in a similar manner as described in connection with identifying minimums and local minima.

Initially, when the example register 220 is empty (e.g., during a reset or start-up), the example summer 216 the initial reference voltage generated by the example initial reference voltage generator 222 with the step size generated by the example step size generator 224. When the example register 220 is not empty (e.g., a previous reference output 218 has been stored), the example summer 216 combines the stored reference output 218 or initial reference voltage with the step size. When the summer 216 receives a value corresponding to a positive direction (e.g., +1), the example summer 216 sums the reference voltage or initial reference voltage and the step size. When the example summer receives a value corresponding to a negative direction (e.g., −1), the example summer 216 finds the difference between the reference voltage or initial reference voltage and the step size (e.g., the example summer 216 finds the sum of the reference voltage or the initial reference voltage and the step size multiplied by the negative direction). For example, the reference output 218 may be substantially equivalent and/or correspond to the reference current minus the positive or negative step-size output (e.g., depending on the state of the example multiplexer 206). When the example multiplexer 206 is outputting a positive step-size, the reference output 218 may be the sum between the initial reference voltage or stored reference output and the step-size (e.g., ref_o=i_ref_v+step_size or ref_o=s_ref o+step_size). When the example multiplexer 206 is outputting a negative step-size, the reference output 218 may be the sum between the initial reference voltage or stored reference output and the opposite of the step-size (e.g., ref_o=ref_i−step_size or ref_o=s_ref_o−step_size). In this manner, when the previous current (e.g., stored in the example register 202) is higher than the present DC current 112, the example reference output 218 will be slightly lower than the reference input current. When the previous current is lower than the present DC current 112, the example reference output 218 will be slightly higher than the reference input current. The example reference output 218 corresponds to a desired amount of change of the Vref 117. In this manner, the example DC/DC converter 118 can adjust the inductor current 114, thereby minimizing power consumption. The example register 220 stores the example reference output 218 and outputs the stored reference output as the example Vref 117 to the example summer 216 and the example DC/DC converter 118 until a subsequent comparison occurs.

In operation, because the efficiency for any power at the load 122 of FIG. 1 is maximized $$\left(\text{e.g., } \eta = \frac{P_{Load}}{P_{input}}\right)$$

when the input power (e.g., $P_{input}=V_{DC}*I_{DC}$) is minimized, the example input power reducer 116 reduces the example Vref 117 so that the example DC/DC converter 118 decreases the inductor current 114 because VDC 110 is a constant voltage source, thereby decreasing the example DC current 112. Additionally, the example input power reducer 116 monitors the DC current 112 (e.g. compares the DC current 112 to a previous DC current (e.g., stored in the example register 202) while the example Vref 117 is decreased to (A) determine when the DC current 112 has reached a minimum amount and (B) maintain the Vref 117 around a voltage corresponding to the minimum DC current 112. The relationship between the DC current 112, the inductor current 114, and the operation of the example input power reducer 116 is further described and illustrated in conjunction with FIG. 4.

While an example manner of implementing the input power reducer 116 of FIG. 1 is illustrated in FIG. 2, one or more of the elements, processes and/or devices illustrated in FIG. 2 may be combined, divided, re-arranged, omitted, eliminated and/or implemented in any other way. Further, the example registers 202, 208, 220 the example comparator 204, the example multiplexer 206, the example summer 216, the example DC/DC converter 118, and/or, more generally, the example input power reducer 116 of FIG. 2 may be implemented by hardware, software, firmware and/or any combination of hardware, software and/or firmware. Thus, for example, any of the example registers 202, 208, 220 the example comparator 204, the example multiplexer 206, the example summer 216, the example DC/DC converter 118, and/or, more generally, the example input power reducer 116 of FIG. 2 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example registers 202, 208, 220 the example comparator 204, the example multiplexer 206, the example summer 216, and/or the example DC/DC converter 118 is/are hereby expressly defined to include a tangible computer readable storage device or storage disk such as a memory, a digital versatile disk (DVD), a compact disk (CD), a Blu-ray disk, etc. storing the software and/or firmware. Further still, the example input power reducer 116 of FIGS. 1 and 2 may include one or more elements, processes and/or devices in addition to, or instead of, those illustrated in FIG. 2, and/or may include more than one of any or all of the illustrated elements, processes and devices.

Figure 3:
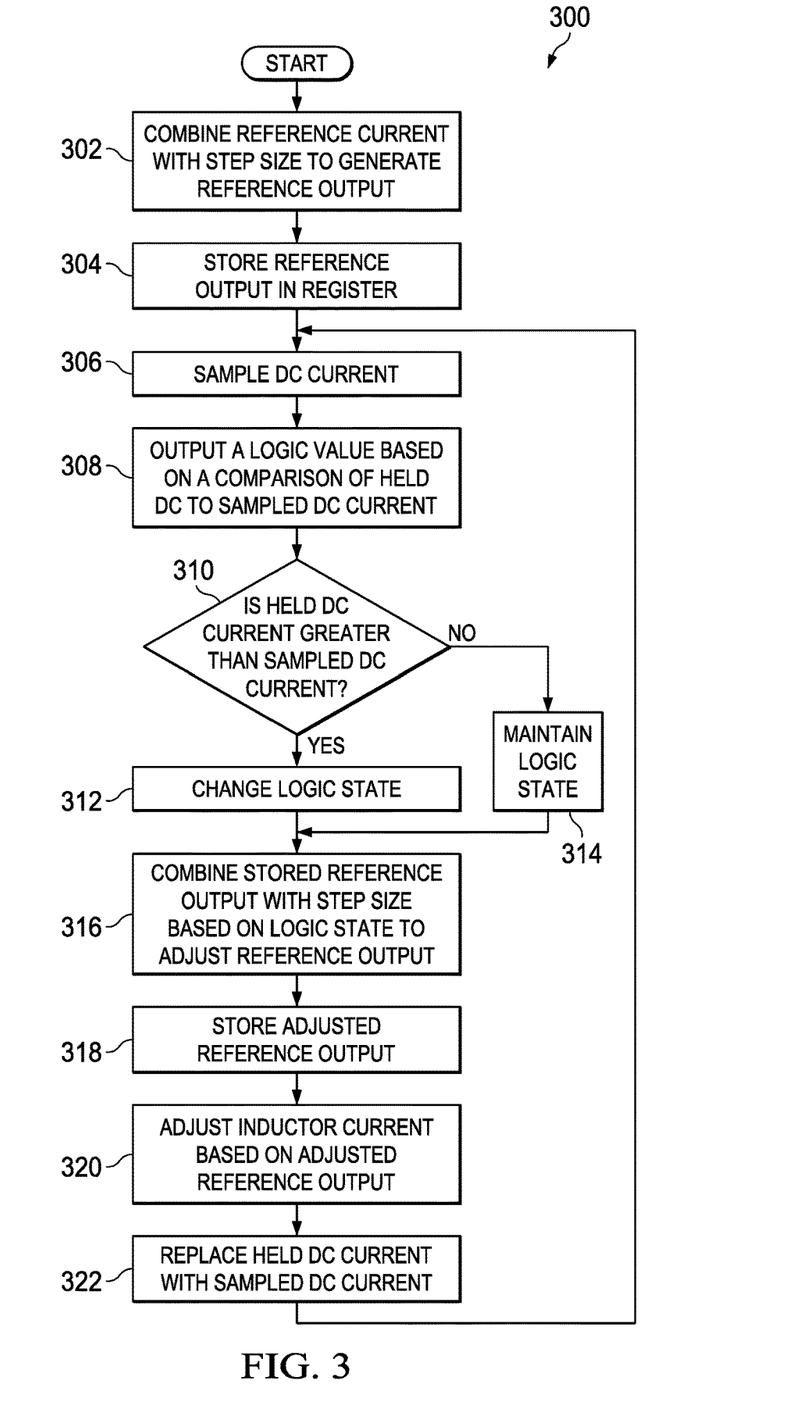
FIG. 3 is a flowchart of an example process, which may be implemented in computer-readable instructions for execution to implement the input power reducer circuit of FIGS. 1 and 2.

A flowchart representative of an example process 300, which may be implemented in example machine-readable instructions to implement the example input power reducer 116 of FIG. 2 is shown in FIG. 3. In this example, the machine readable instructions comprise a program for execution by a processor such as the processor 512 shown in the example processor platform 500 discussed below in connection with FIG. 5. The program may be embodied in software stored on a tangible computer readable storage medium such as a CD-ROM, a floppy disk, a hard drive, a digital versatile disk (DVD), a Blu-ray disk, or a memory associated with the processor 512, but the entire program and/or parts thereof could alternatively be executed by a device other than the processor 512 and/or embodied in firmware or dedicated hardware. Further, although the example program is described with reference to the flowchart illustrated in FIG. 3, many other methods of implementing the example input power reducer 116 may alternatively be used. For example, the order of execution of the blocks may be changed, and/or some of the blocks described may be changed, eliminated, or combined.

As mentioned above, the example process of FIG. 3 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and transmission media. As used herein, "tangible computer readable storage medium" and "tangible machine readable storage medium" are used interchangeably. Additionally or alternatively, the example processes of FIG. 3 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and transmission media. As used herein, when the phrase "at least" is used as the transition term in a preamble of a claim, it is open-ended in the same manner as the term "comprising" is open ended. Comprising and all other variants of "comprise" are expressly defined to be open-ended terms. Including and all other variants of "include" are also defined to be open-ended terms. In contrast, the term consisting and/or other forms of consist are defined to be close-ended terms.

FIG. 3 is an example flowchart 300 representative of example machine readable instructions that may be executed by the input power reducer 116 of FIGS. 1 and 2 to reduce the input power of the example transmitter 102, thereby maximizing the efficiency of wireless power transfer.

At block 302, the example summer 216 combines the reference voltage output by the initial reference voltage generator 222 with the step size output by the step size generator 224 to generate the example reference output 218. As described above, the example summer 216 combines the reference voltage when the example register 220 is empty (e.g., during start-up or reset). As described above, the example step-size may correspond to a fraction (e.g., ⅛, 1/32, 1/64, etc.) of the example Vref 117. At block 304, the example register 220 stores the reference output 218. At block 306, the example comparator 204 samples the example DC current 112.

At block 308, the example comparator 204 outputs a logic value based on a comparison of the DC current held in the example registers 202 (e.g., a value representative of the held DC current) to the currently sampled DC current 112 (e.g., a value representative of the currently sampled DC current 112). As described above, the comparison determines whether the DC current 112 is increasing or decreasing due to changes of the example Vref 117. Because power efficiency is maximized with the DC current 112 is minimized, the example input power reducer 116 continues to lower the example Vref 117 until the example DC current 112 increases (e.g., corresponding to the DC current 112 minimum).

At block 310, the feedback loop 205 determines whether the held DC current (stored in the example register 202) is more than the sampled DC current 112 based on the logic value of the example comparator 204. For example, if the logic value is first logic value the example multiplexer 206 will output the first direction value and if the logic value is a second logic value, the example multiplexer 206 will output a second direction value. However, as explained above, the direction values are stored in the example register 208 and fed back to the multiplexer after being scaled by the example scalers 2112, 214. In this manner, the example feedback loop 205 only changes direction if the held DC current is greater than the sampled DC current.

If the current comparator 204 determines that the held DC current is more than the sampled DC current, the example current comparator 204 changes logic state, thereby causing the example multiplexer 206 to change output directions (e.g., from −1 to +1 or from +1 to −1) (block 312). If the current comparator 204 determines that the held DC current is not more than the sampled DC current, the example current comparator 204 and the example multiplexer 206 maintain their output (block 314).

At block 316, the example summer 216 combines the reference output 218 stored in the example register 220 (e.g., the previously generated reference output 218) with the step-size to adjust the reference output 218. As described above, when the direction is a positive direction, the example summer 216 combines the stored reference output 218 and the step-size by adding the stored reference output 218 and the step-size. When the direction is a negative direction, the example summer 216 combines the stored reference output 218 and the step-size by subtracting the stored reference output 218 and the step-size. The example reference output 218 corresponds to an amount of desired change to the Vref 117. At block 318, the example register 220 stores the adjusted reference output. In some examples, the example register 220 replaces the previously stored output with the adjusted output.

At block 320, the example DC/DC converter 118 adjusts the inductor current 114 based on the adjusted reference output 218 (e.g., which is output as the example Vref 117). For example, if the example reference output 218 corresponds to a decrease in the example Vref 117, the example Dc/DC converter 118 will decrease the voltage applied to the inductor 105, thereby reducing the inductor current 114. Depending on the load 122 of the receiver 104 of FIG. 1, decreasing the voltage output by the DC/DC converter 118 may increase or decrease the example DC current 112. As described above, decreasing the example DC current 112 increases the efficiency of power transfer until the example DC current 112 reaches its minimum value. If the DC current 112 increases, the voltage output by the DC/DC converter 118 will need to be increased to maintain the minimum DC current 112, as further described in conjunction with FIG. 4.

At block 322, the example register 202 replaces the held DC current with the sampled DC current 112. In this manner, a subsequent loop through the example flowchart 300 will correspond to a comparison of the DC current 112 after adjusting to the change in Vref 117 and the previously sampled DC current. An example implementation of the example flowchart 300 is illustrated and further described below in conjunction with FIG. 4.

FIG. 4 is an example graph 400 illustrating an implementation of the example process of FIG. 3. The example graph 400 illustrates the example DC current 112 vs. the inductor current 114. The example graph 400 includes the example DC current 112 as a Y-axis 402 and the inductor current 114 as an X-axis 404. In the illustrated example of FIG. 4, the graph 400 of the example DC current 112 vs. the inductor current 114 is curve shaped function and/or any other type of function with an absolute minimum. However, other waveforms may be reflected by the relationship between the example DC current 112 vs. the inductor current 114 in different wireless power transfer circuits. At starting point 405, the example transmitter 102 operates outputs the DC current 112 at a first level. The first level may be selected based on a standard output load (e.g., the example load 122 of FIG. 1). At the example starting point 405, it is not yet known whether the transmitter current 114 is operating at an optimal level. Accordingly, the example input power reducer 116 initiates the process of FIG. 4 (e.g., using initial stored values of the example registers 202, 208, 220 of FIG. 2) until the example DC current 112 is reduced to an optimal amount (e.g., the minimum of the example graph 400.

In the illustrated example of FIG. 4, a first adjustment is made to the inductor current 114 (e.g., I1) from a starting point 405 as indicated by a first step 406. The first step 406 corresponds to a decrease in the inductor current 114 from the starting point 405. As described above in conjunction with FIG. 2, the example DC/DC converter 118 decreases the voltage applied to the example inductor 106 to decrease the inductor current 114. As illustrated in FIG. 4, the decrease in the inductor current 114 corresponds to an increase in the example DC current 112. As discussed herein, if the example DC current 112 increases (e.g., first value of the example DC current<second value of the example DC current) as a result of an adjustment to the inductor current 114, the direction of the next step is changed to the opposite direction (e.g., by switching the output of the example multiplexer 206 of FIG. 2) corresponding to an increase of the example Vref 117. Accordingly, a second step 408, corresponding to an increase in the inductor current 114, subsequently occurs. As illustrated in FIG. 4, the increase in the inductor current 114 by the second step 408 corresponds to a decrease in the example DC current 112. As discussed herein, if the example DC current 112 decreases (e.g., first value of the example DC current>second value of the example DC current) as a result of an adjustment to the inductor current 114, the direction of the next step is maintained in the same direction (e.g., the example multiplexer 206 does not change state). Accordingly, a third step 410, corresponding to an increase in the inductor current 114 by increasing the voltage applied to the example inductor 106, subsequently occurs.

As illustrated in FIG. 4, a fourth step 412, a fifth step 414, a sixth step 416, and a seventh step 418 correspond to increases in the inductor current 114 and decreases to the example DC current 112. However, an eighth step 420 corresponds to an increase in the inductor current 114 and an increase to the example DC current 112. As discussed herein, if the example DC current 112 increases (e.g., first value of the example DC current<second value of the example DC current) as a result of an adjustment to the inductor current 114, the direction of the next step is changed to the opposite direction (e.g., changing the state of the example multiplexer 206). Accordingly, a ninth step 422, corresponding to a decrease in the inductor current 114 by decreasing the example Vref 117, subsequently occurs. The decrease in the inductor current 114 by the ninth step 422 corresponds to a decrease in the example DC current 112. As discussed herein, if the example DC current 112 decreases (e.g., first value of the example DC current>second value of the example DC current) as a result of an adjustment to the inductor current 114, the direction of the next step is maintained in the same direction. Accordingly, a tenth step 424, corresponding to a decrease in the inductor current 114, subsequently occurs.

As illustrated in FIG. 4, a subsequent step after the tenth step 424 would reflect an increase to the example DC current 112, and thus, the seventh step 418 would repeat. In some examples, the steps 418, 420, 422, 424 continue to cycle, thereby keeping the example DC current 112 at a minimum. In some examples, the step-sizes decrease when multiple direction changes (e.g., directions reverse or otherwise go in the opposite direction) occur within a threshold amount of time. In such examples, the minimum example DC current 112 can be determined based on the inductor current 114 only, without continuous communication between the transmitter 102 and the receiver 104.

Figure 5:
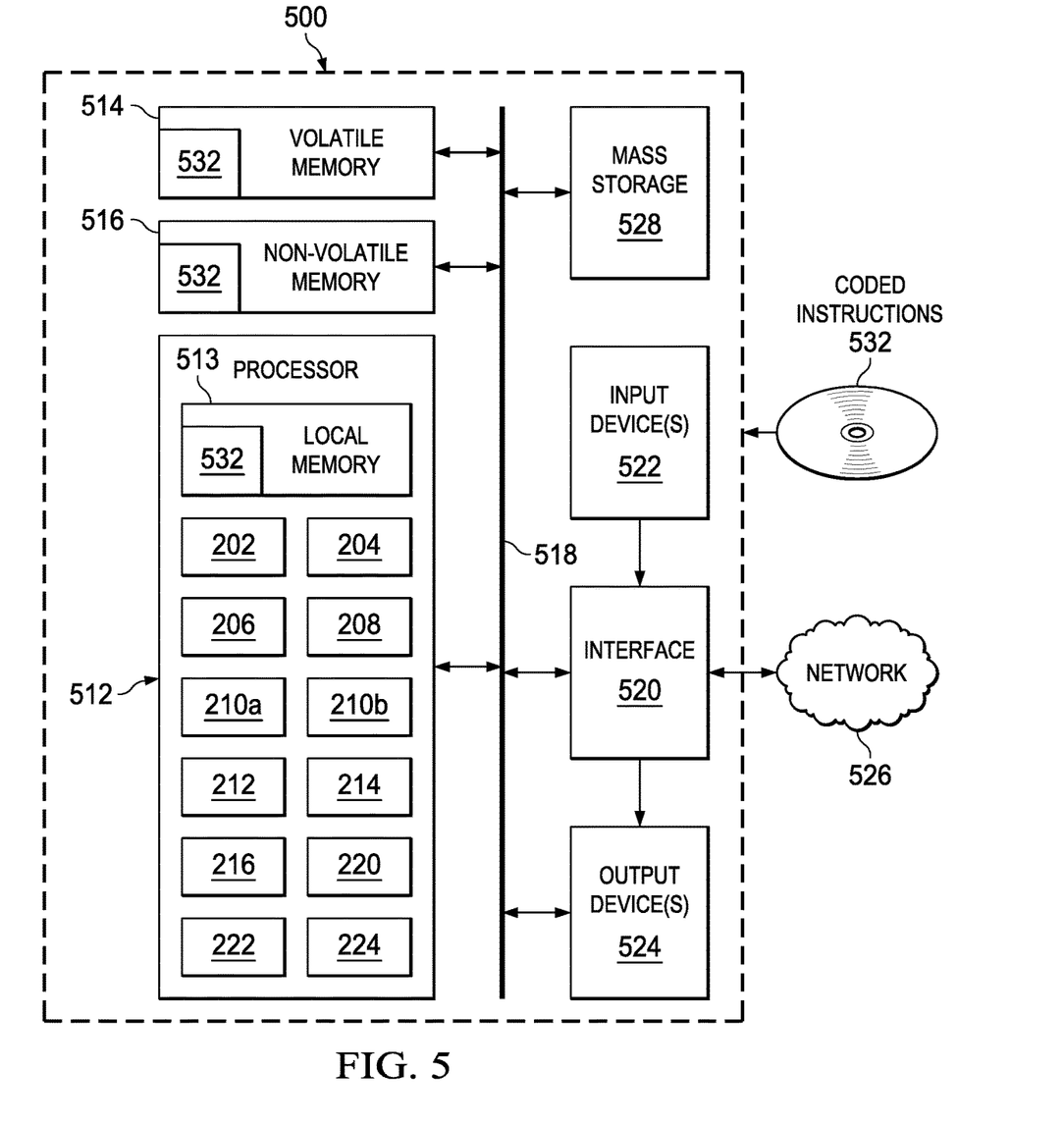
FIG. 5 is an example processor platform that may execute the example computer readable instructions of FIG. 3 to implement the input power reducer circuit of FIGS. 1 and 2.

FIG. 5 is a block diagram of an example processor platform 500 capable of executing the instructions of FIG. 3 to implement the input power reducer 116 of FIG. 2. The processor platform 500 can be, for example, a server, a personal computer, a mobile device (e.g., a cell phone, a smart phone, a tablet such as an iPad), a personal digital assistant (PDA), an Internet appliance, a DVD player, a CD player, a digital video recorder, a Blu-ray player, a gaming console, a personal video recorder, a set top box, or any other type of computing device.

The processor platform 500 of the illustrated example includes a processor 512. The processor 512 of the illustrated example is hardware. For example, the processor 512 can be implemented by one or more integrated circuits, logic circuits, microprocessors or controllers from any desired family or manufacturer. In some examples, the processor 512 implements the example registers 202, 208, 220 the example comparator 204, the example multiplexer 206, the example summer 216, and/or the example DC/DC converter 118, of FIG. 2.

The processor 512 of the illustrated example includes a local memory 513 (e.g., a cache). The processor 512 of the illustrated example is in communication with a main memory including a volatile memory 514 and a non-volatile memory 516 via a bus 518. The volatile memory 514 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 516 may be implemented by flash memory and/or any other desired type of memory device. Access to the main memory 514, 516 is controlled by a memory controller.

The processor platform 500 of the illustrated example also includes an interface circuit 520. The interface circuit 520 may be implemented by any type of interface standard, such as an Ethernet interface, a universal serial bus (USB), and/or a PCI express interface.

In the illustrated example, one or more input devices 522 are connected to the interface circuit 520. The input device(s) 522 permit(s) a user to enter data and commands into the processor 512. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 524 are also connected to the interface circuit 520 of the illustrated example. The output devices 524 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 520 of the illustrated example, thus, typically includes a graphics driver card, a graphics driver chip or a graphics driver processor.

The interface circuit 520 of the illustrated example also includes a communication device such as a transmitter, a receiver, a transceiver, a modem and/or network interface card to facilitate exchange of data with external machines (e.g., computing devices of any kind) via a network 526 (e.g., an Ethernet connection, a digital subscriber line (DSL), a telephone line, coaxial cable, a cellular telephone system, etc.).

The processor platform 500 of the illustrated example also includes one or more mass storage devices 528 for storing software and/or data. Examples of such mass storage devices 528 include floppy disk drives, hard drive disks, compact disk drives, Blu-ray disk drives, RAID systems, and digital versatile disk (DVD) drives.

The coded instructions 532 of FIG. 3 may be stored in the mass storage device 528, in the volatile memory 514, in the non-volatile memory 516, and/or on a removable tangible computer readable storage medium such as a CD or DVD.

Accordingly, the above described methods, apparatus and articles of manufacture adjust a voltage across an inductor of a transmitter to adjust the current through the inductor (e.g., the inductor current) to decrease the DC input current. In examples where the input voltage is constant, a decrease in the DC input current is proportional to a decrease in the input power. For a given load, the lowest input power that can supply the output power required by the load is the most optimal power level. The described methods and apparatus determine the minimum input power required to supply the necessary output power without continuous communication between the transmitter and the receiver corresponding to conventional wireless power techniques. Accordingly, the described methods and apparatus achieve a high efficiency in wireless power transfer while avoiding unnecessary power consumption of such conventional communications.

Modifications are possible in the described embodiments, and other embodiments are possible, within the scope of the claims.

What is claimed is:

1. An apparatus comprising:
a first transistor having first and second current terminals, the first current terminal adapted to be coupled to a first terminal of an inductor, and the second current terminal adapted to be coupled to a second terminal of the inductor;
a second transistor having third and fourth current terminals, the third current terminal coupled to the second current terminal;
a power converter having a reference voltage input and a voltage output, the voltage output coupled to the fourth current terminal, and the power converter configured to adjust a voltage at the voltage output responsive to a reference voltage at the reference voltage input; and
a reference voltage adjuster having a current input and a reference voltage output, the current input adapted to be coupled through a power source to the first current terminal, and the reference voltage output coupled to the reference voltage input, the reference voltage adjuster including:
- a comparator having a comparator output and first and second comparator inputs, the comparator configured to generate a comparison signal at the comparator output indicative of whether a first current value at the first comparator input is greater or less than a second current value at the second comparator input, the first current value indicative of a first sampled current at the current input, and the second current value indicative of a second sampled current at the current input, in which the second sampled current is sampled after the first sampled current;
- feedback circuitry having a comparison input and a direction output, the comparison input coupled to the comparator output, and the feedback circuitry configured to: when the comparison signal indicates the second current value is greater than the first current value, change a direction value at the direction output; and when the comparison signal indicates the second current value is less than the first current value, maintain the direction value at the direction output; and
- a summer coupled between the direction output and the reference voltage output, the summer configured to: when the direction value is a first direction value, increase the reference voltage at the reference voltage output by a step size; and when the direction value is a second direction value different than the first direction value, decrease the reference voltage at the reference voltage output by the step size.

2. The apparatus of claim 1, wherein the inductor is part of a wireless power transmitter.

3. The apparatus of claim 1, wherein the step size is a fraction of the reference voltage.

4. The apparatus of claim 1, wherein the apparatus is configured to increase a voltage across the inductor responsive to the summer increasing the reference voltage, and to decrease the voltage across the inductor responsive to the summer decreasing the reference voltage.

5. The apparatus of claim 4, wherein the second current value is responsive to the voltage across the inductor.

6. The apparatus of claim 1, wherein the reference voltage adjuster includes a register configured to store the first current value, the first current value corresponding to a direct current at a first time, and the second current value corresponding to the direct current at a second time later than the first time.

7. The apparatus of claim 1, wherein the second current terminal is adapted to be coupled through a capacitor to the second terminal of the inductor.

8. The apparatus of claim 7, wherein the capacitor is a first capacitor, and the first current terminal is adapted to be coupled through a second capacitor to the fourth current terminal.

9. The apparatus of claim 1, wherein the power converter has a feedback input, and the apparatus further comprises a filter having a filter input and a filter output, the filter input adapted to be coupled to the second terminal of the inductor, and the filter output coupled to the feedback input.

10. The apparatus of claim 1, wherein the current input is a first current input, and the power converter has a second current input adapted to be coupled through the power source to the first current terminal.

* * * * *